United States Patent
Aoki

(10) Patent No.: US 12,126,941 B2
(45) Date of Patent: Oct. 22, 2024

(54) REARWARD IMAGE DISPLAYING DEVICE AND REARWARD IMAGE DISPLAYING METHOD

(71) Applicant: Faurecia Clarion Electronics Co., Ltd., Saitama (JP)

(72) Inventor: Hiroshi Aoki, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 88 days.

(21) Appl. No.: 17/972,229

(22) Filed: Oct. 24, 2022

(65) Prior Publication Data

US 2023/0135043 A1     May 4, 2023

(30) Foreign Application Priority Data

Oct. 29, 2021    (JP) .................................. 2021-177105

(51) Int. Cl.
    H04N 7/18        (2006.01)
(52) U.S. Cl.
    CPC .................................. H04N 7/183 (2013.01)
(58) Field of Classification Search
    None
    See application file for complete search history.

(56) References Cited

U.S. PATENT DOCUMENTS

2020/0086792 A1* 3/2020 Kikuchi ............... H04N 5/2628

FOREIGN PATENT DOCUMENTS

| CA | 3029410 A1 | * | 1/2018 | ............... B60R 1/00 |
| JP | 2018150010 A | * | 9/2018 | |
| KR | 20230065928 A | * | 9/2023 | |
| WO | WO-2018042976 A1 | * | 3/2018 | ............... B60R 1/00 |

OTHER PUBLICATIONS

English translation of JP-2018150010-A, Katsuyama, 2018 (Year: 2018).*
English translation of WO-2018042976-A1, Kanaya, 2018 (Year: 2018).*
English translation of KR-20230065928-A, Choi, 2023 (Year: 2023).*

* cited by examiner

*Primary Examiner* — James M Hannett
(74) *Attorney, Agent, or Firm* — IP Business Solutions, LLC

(57) ABSTRACT

A rearward image displaying device includes an imaging portion configured to generate a captured image by imaging, through a camera, to the rear of a vehicle; a first generating portion configured to generate a first rearward image by extracting an image from a region of a portion of the captured image; an incline detecting portion configured to detect an incline angle of the vehicle; a second generating portion configured to extract an image from a region that is another portion of the captured image, based on the incline angle, to generate a second rearward image that is different from the first rearward image; and a display controlling portion configured to displaying the first rearward image and the second rearward image on a display.

10 Claims, 8 Drawing Sheets

REARWARD IMAGE DISPLAYING DEVICE AND REARWARD IMAGE DISPLAYING METHOD

CROSS-REFERENCE TO RELATED APPLICATIONS

The present application claims priority under 35 U.S.C. § 119 to Japanese Patent Application No. 2021-177105 filed on Oct. 29, 2021. The content of the application is incorporated herein by reference in its entirety.

BACKGROUND OF THE INVENTION

Field of the Invention

The present invention relates to a rearward image displaying device and rearward image displaying method.

Description of the Related Art

Conventionally technologies for displaying an image to the rear of the vehicle have been disclosed.

The vehicle rearward displaying device set forth in Patent Document 1 comprises: a camera for imaging to the rear of a vehicle; a display processing portion for displaying the rearward vehicle image that was captured by the camera; an incline detecting portion for detecting a change in incline in the front/rear direction of the vehicle; and an imaging range switching portion for switching, in the vertical direction, the imaging range that corresponds to a range displayed by the display processing portion while traveling over a prescribed range after detecting a change in the incline, and then returning the imaging range to the original imaging range after there has ceased to be a change in incline.

PRIOR ART DOCUMENT

Patent Document

[Patent Document 1] Japanese Unexamined Patent Application Publication 2018-150010

However, with the technology set forth in Patent Document 1, the imaging range is switched in accordance with a change in incline in the front/rear direction of the vehicle, so there have been cases wherein it has been difficult to identify visually what type of vehicle is traveling to the rear of the vehicle.

SUMMARY OF THE INVENTION

The object of the present invention is to provide a rearward image displaying device and rearward image displaying method wherein visual identification of the type of vehicle that is traveling to the rear of the vehicle is easy.

In order to achieve the object set forth above, the rearward image displaying device according to the present invention comprises: an imaging portion configured to generate a captured image by imaging, through a camera, to the rear of a vehicle; a first generating portion configured to generate a first rearward image by extracting an image from a region of a portion of the captured image; an incline detecting portion configured to detect an incline angle of the vehicle; a second generating portion configured to generate a second rearward image, which is different from the first rearward image, by extracting an image from a region of another portion of the captured image depending on the incline angle; and a display controlling portion configured to display the first rearward image and the second rearward image on a display.

In order to achieve the object set forth above, the rearward image displaying method according to the present invention includes: an imaging step for generating a captured image by imaging, through a camera, to the rear of a vehicle; a first generating step for generating a first rearward image by extracting an image from a region of a portion of the captured image; an incline detecting step for detecting an incline angle of the vehicle; a second generating step for generating a second rearward image, which is different from the first rearward image, by extracting an image from a region of another portion of the captured image depending on the incline angle; and a display controlling step for displaying the first rearward image and the second rearward image on a display.

Effects of the Invention

In the present invention, a first rearward image that is generated by extracting an image from a region that is part of a captured image and a second rearward image is generated by extracting an image from a region that is another part of the captured image are displayed on a display, enabling easy visual identification of what type of vehicle is traveling to the rear of the vehicle.

DETAILED DESCRIPTION OF THE INVENTION

An embodiment according to the present invention will be explained below referencing the drawings.

Figure 1:
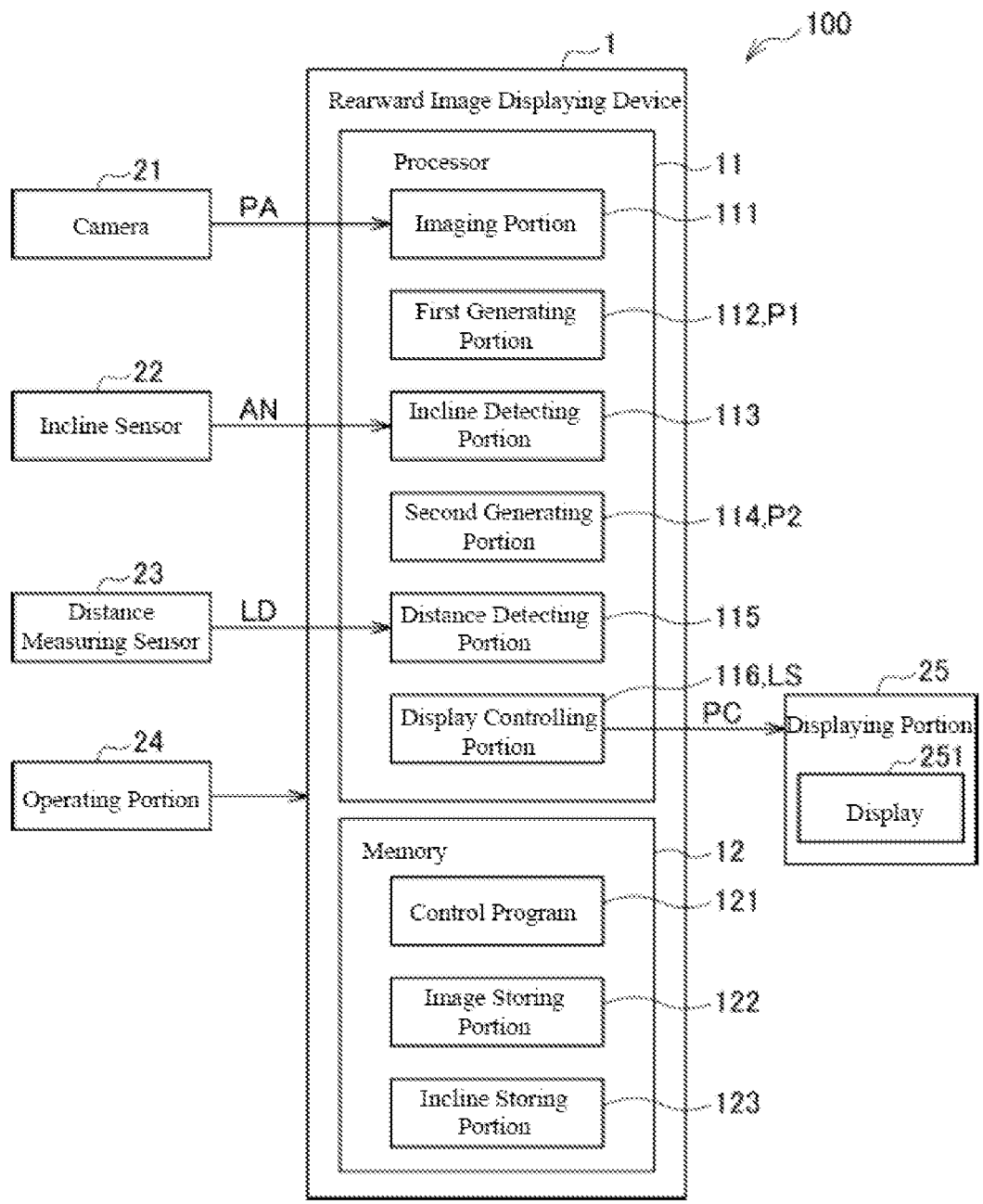
FIG. 1 is a diagram depicting an example of a structure for a rearward image displaying system and rearward image displaying device.

The structure of a rearward image displaying system 100 and a rearward image displaying device 1 will be explained first, referencing FIG. 1. FIG. 1 is a diagram depicting an example of the structure of a rearward image displaying system 100 and of a rearward image displaying device 1.

As illustrated in FIG. 1, the rearward image displaying system 100 comprises a rearward image displaying device 1, a camera 21, an incline sensor 22, a distance measuring sensor 23, an operating portion 24, and a displaying portion 25. The rearward image displaying system 100 is mounted in a vehicle V1. The vehicle V1 will be explained in reference to FIG. 2.

A camera 21 follows an instruction from the rearward image displaying device 1 to capture an image to the rear of the vehicle V1, to generate a captured image PA. The camera 21 comprises an image sensor such as a CCD (Charge-Coupled Device), CMOS (Complementary Metal-Oxide-Semiconductor), or the like, and a data processing circuit for generating the captured image PA from the image sensor.

The imaging range corresponding to the captured image PA of the camera 21 is wider than the corresponding imaging range of the rearward image that is to be displayed on a display 251. The rearward image is, for example, a first rearward image P1. In other words, an imaging viewing angle AVA that indicates an imaging range corresponding to the captured image PA is larger than a reference viewing angle AVT that indicates the imaging range of the first rearward image P1.

The first rearward image P1, the imaging viewing angle AVA, and the reference viewing angle AVT will be explained in reference to FIG. 2.

The incline sensor 22 detects an incline angle AN of the vehicle V1. The incline angle AN is at an angle between the front/rear direction of the vehicle V1, or the direction of travel D1, and the horizontal direction DH. The incline sensor 22 comprises a sensor such as an acceleration sensor, a gyro sensor, or the like, and a data processing circuit for generating the incline angle AN from the sensor.

The direction of travel D1, the horizontal direction DH, and the incline angle AN will be explained in reference to FIG. 2.

The distance measuring sensor 23 is, for example, a LiDAR (Light Detection and Ranging) equipped on the vehicle V1, and uses an electromagnetic signal to detect the distance LD to another vehicle V2 that is traveling to the rear of the vehicle V1.

Although in the present embodiment the explanation will be for a case wherein the distance measuring sensor 23 is a LiDAR, there is no limitation thereto. The distance measuring sensor 23 may instead use, for example, a radar or a sonar sensor.

The operating portion 24 comprises keys, switches, or the like, and receives operations from a user who is riding in the vehicle V1. The user may be, for example, the driver. The operating portion 24 outputs, to the rearward image displaying device 1, an operating signal in accordance with the operations it has received. The operations received by the operating portion 24 include, for example, an operation for displaying the first rearward image P1 on the display 251 as a main image PM, an operation for displaying on the display 251 a second rearward image P2 as the main image PM, and the like. The second rearward image P2 and the main image PM will be explained in reference to FIG. 2.

The displaying portion 25 comprises a display 251, and displays various images on the display 251. A liquid crystal display, an organic EL display, or the like, is used for the display 251.

The displaying portion 25 displays the first rearward image P1, the second rearward image P2, and the like, on the display 251.

The rearward image displaying device 1 is a computer comprising a processor 11, such as a CPU (Central Processing Unit) or MPU (Micro-Processing Unit), or the like, and a memory 12, such as a ROM (Read-Only Memory) or RAM (Random Access Memory), or the like. The rearward image displaying device 1 comprises, in addition to these devices, a storage device such as an HDD (Hard Disk Drive) or an SSD (Solid State Drive), or the like, an interface circuit for connecting sensors, peripheral devices, and the like, and an onboard network communication circuit for communicating with other onboard devices. In the rearward image displaying device 1, a variety of functional structures is achieved through a processor 11 executing a control program 121 that is stored in the memory 12.

The rearward image displaying device 1 is structured, for example, from an ECU (Electronic Control Unit).

Although in the present embodiment the explanation is for a case wherein the rearward image displaying device 1 is structured from an ECU, there is no limitation thereto. The rearward image displaying device 1 should be a computer comprising a processor 11 and a memory 12. For example, the rearward image displaying device 1 may be structured from a personal computer, or structured from a tablet terminal.

The rearward image displaying device 1 comprises an imaging portion 111, a first generating portion 112, an incline detecting portion 113, a second generating portion 114, a distance detecting portion 115, a display controlling portion 116, an image storing portion 122, and an incline storing portion 123. Specifically, the processor 11 functions as the imaging portion 111, the first generating portion 112, the incline detecting portion 113, the second generating portion 114, the distance detecting portion 115, and the display controlling portion 116 through executing a control program 121 that is stored in the memory 12. Additionally, through the processor 11 executing a control program 121 that is stored in the memory 12, the memory 12 is caused to function as the image storing portion 122 and the incline storing portion 123.

The image storing portion 122 stores the captured image PA. The captured image PA is acquired from the camera 21 by the imaging portion 111 and stored in the image storing portion 122. The captured image PA is read out by the first generating portion 112 and the second generating portion 114.

The incline storing portion 123 stores the incline angle AN. The incline angle AN is acquired from the incline sensor 22 by the incline detecting portion 113 and stored in the incline storing portion 123. The incline angle AN is read out by the second generating portion 114.

The imaging portion 111 captures an image to the rear of the vehicle V1 through a camera 21, to generate to the captured image PA. Specifically, the imaging portion 111 acquires the captured image PA by imaging using the camera 21. Additionally, the imaging portion 111 causes the captured image PA to be stored in the image storing portion 122.

The first generating portion 112 generates the first rearward image P1 by extracting an image from a region that is part of the captured image PA. The first rearward image P1 may be, for example, a reference rearward image PT. The reference rearward image PT is an image extracted from a region of the center portion of the captured image PA.

The reference rearward image PT will be explained further in reference to FIG. 2.

The incline detecting portion 113 detects the incline angle AN of the vehicle V1. Specifically, the incline detecting portion 113 acquires the incline angle AN detected by the incline sensor 22. The incline detecting portion 113 stores the incline angle AN in the incline storing portion 123.

The second generating portion 114 extracts an image from a region that is another portion of the captured image PA, based on the incline angle AN, to generate a second rearward image P2 that is different from the first rearward image P1. The second rearward image P2 includes a top rearward image PU and a bottom rearward image PD. The top rearward image PU is an image to the upper rear of the vehicle V1, within image PA. The bottom rearward image PD is an image to the bottom rear of the vehicle V1, within the captured image PA.

The top rearward image PU and the bottom rearward image PD will be explained further in reference to FIG. 2.

Specifically, depending on a state evaluated by the display controlling portion 116, the second generating portion 114 generates the top rearward image PU or the bottom rearward image PD as the second rearward image P2. The state evaluated by the display controlling portion 116 is a first state ST1 through a fourth state ST4.

The relationship between the first state ST1 through the fourth state ST4 and the image generated by the second generating portion 114 will be explained in reference to FIG. 2 through FIG. 6.

The distance detecting portion 115 detects a distance LD between the vehicle V1 and another vehicle V2 that is traveling to the rear of the vehicle V1. Specifically, the distance detecting portion 115 acquires the distance LD from the distance measuring sensor 23.

The display controlling portion 116 displays the first rearward image P1 and the second rearward image P2 on the display 251.

Specifically, the display controlling portion 116 displays a main image PM that is displayed in a first region AR1 of the display region AR of the display 251, and a sub-image PS that is displayed in a second region AR2, which is narrower than the first region AR1, in the display region AR. Moreover, the display controlling portion 116 displays one of these images, the first rearward image P1 or the second rearward image P2, as the main image PM, and displays the other of these images, the first rearward image P1 or the second rearward image P2, as the sub-image PS.

The first region AR1 and the second region AR2 will be explained further in reference to FIG. 3 through FIG. 6.

For example, the display controlling portion 116 displays the first rearward image P1 as the main image PM in the first region AR1 within the display region AR of the display 251, and displays the second rearward image P2 as the sub-image PS in the second region AR2 within the display region AR of the display 251. Additionally, the display controlling portion 116 may display the second rearward image P2 as the main image PM in the first region AR1 within the display region AR of the display 251, and may display the first rearward image P1 as the sub-image PS in the second region AR2 within the display region AR of the display 251.

Furthermore, for example, the display controlling portion 116 may display the main image PM in the entirety of the display region AR of the display 251. A region that does not include an image of a vehicle in the main image PM is set for the second region AR2. The sub-image PS is displayed in the second region AR2.

Additionally, in response to a change in the incline angle AN over time, for example, the display controlling portion 116 may determine which image, of the first rearward image P1 and the second rearward image P2, is to be displayed as the main image PM in the first region AR1.

In response to a change of the incline angle AN over time, for example, the display controlling portion 116 may evaluate whether the vehicle V1 is in a first state ST1, a second state ST2, a third state ST3, or a fourth state ST4.

The first state ST1 is a state wherein the vehicle V1 has entered onto an upwardly inclined road RU from a first road R1 that is substantially level. The second state ST2 is a state wherein the vehicle V1 has entered into a second road R2 that is substantially level from an upwardly inclined road RU. The third state ST3 is a state wherein the vehicle V1 has entered into a downwardly inclined road RD from a second road R2 that is substantially level. The fourth state ST4 is a state wherein the vehicle V1 has entered into a third road R3 that is substantially level from the downwardly inclined road RD.

The first state ST1 through fourth state ST4 will be explained further in reference to FIG. 3 through FIG. 6.

Additionally, if the distance LD detected by the distance detecting portion 115 is equal to or less than a threshold value LS, the display controlling portion 116 does not display the second rearward image P2 on the display 251. The threshold value LS may be, for example, 10 m. In this case, the display controlling portion 116 displays the first rearward image P1 alone in the entirety of the display region AR of the display 251.

Note that the threshold value LS may instead be set depending on the speed of travel of the vehicle V1. For example, preferably the threshold value LS is longer at faster travel speeds of the vehicle V1. Additionally, the threshold value LS may be set in accordance with the change in the incline angle AN over time, for example.

Preferably the threshold value LS is shorter the greater the change in the incline angle AN over time.

While, in the present embodiment, the explanation is for a case wherein the display controlling portion 116 determines which image, of the first rearward image P1 and the second rearward image P2, to display in the first region AR1 as the main image PM depending on the change in the incline angle AN over time, there is no limitation thereto. For example, the display controlling portion 116 may determine instead which image, of the first rearward image P1 and the second rearward image P2, to display the first region AR1 as the main image PM in response to an operation by the user on the operating portion 24.

While, in the present embodiment, the explanation is for a case wherein the display controlling portion 116 displays a main image PM that is displayed in the first region AR1 within the display region AR of the display 251 and a sub-image PS that is displayed in a second region AR2, which is narrower than the first region AR1, within the display region AR, there is no limitation thereto. The display controlling portion 116 should instead display the first rearward image P1 and the second rearward image P2 on the display 251.

The display controlling portion 116 may, for example, divide the display region AR of the display 251 into two equal parts, and display the first rearward image P1 in one of the display regions and display the second rearward image P2 in the other display region. The display controlling portion 116 may instead, for example, divide the display region AR of the display 251 into two equal parts, a right display region and a left display region, and display the first rearward image P1 in the right display region and the second rearward image P2 in the left display region.

Figure 2:
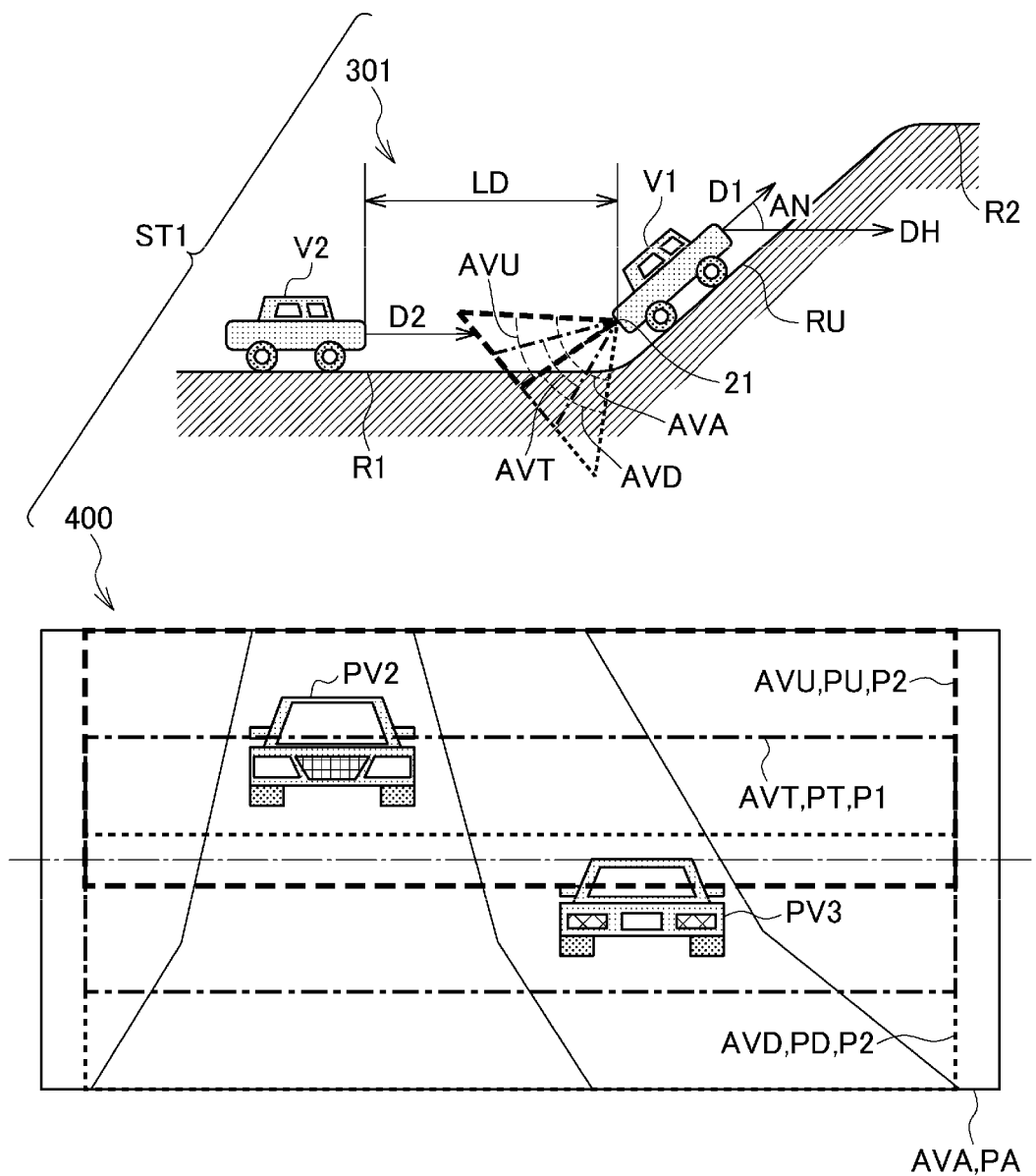
FIG. 2 is a diagram depicting an example of a reference rearward image, a top rearward image, and a bottom rearward image.

FIG. 2 will be referenced next to explain the reference rearward image PT, the top rearward image PU, and the bottom rearward image PD. FIG. 2 is a diagram depicting an example of the reference rearward image PT, the top rearward image PU, and the bottom rearward image PD.

FIG. 2 depicts a side view 301 that shows an example of the change in the incline angle AN of the road traveled by the vehicle V1 and an image diagram 400 that shows an example of the captured image PA that is captured by the camera 21.

The side view 301 shows the vehicle V1 that is traveling in the travel direction D1, and the vehicle V2 that is traveling in the travel direction D2, to the rear of the vehicle V1. The vehicle V1 has entered into an upwardly inclined road RU from a first road R1 that is substantially level. That is, the side view 301 shows that the vehicle V1 is in the first state ST1. The upwardly inclined road RU is positioned connecting between a substantially level first road R1 and a substantially level second road R2. The incline angle AN of the vehicle V1 is the angle formed between the travel direction D1 of the vehicle V1 and the horizontal direction DH.

The incline angle AN is detected by the incline sensor 22.

The distance LD is the distance between the vehicle V1 and the vehicle V2. The distance LD is detected by the distance measuring sensor 23.

The vehicle V2 corresponds to an example of "another vehicle."

The camera 21 is disposed on the rear of the vehicle V1. The imaging viewing AVA indicated by the dotted lines shows the imaging range of the camera 21 in the vertical direction.

The imaging viewing AVA may be, for example, 90°. The reference viewing angle AVT, indicated by the dash-dot lines, shows the imaging range, in the vertical direction, of the camera 21 corresponding to a reference rearward angle PT. A top viewing angle AVU, indicated by the dotted lines, indicates the imaging range, in the vertical direction, of the camera 21 corresponding to the top rearward image PU. The bottom viewing angle AVD, indicated by the dotted lines, indicates the imaging range, in the vertical direction, of the camera 21, corresponding to the bottom rearward image PD. The reference viewing angle AVT, the top viewing angle AVU, and the bottom viewing angle AVD may each be, for example, 45°.

The captured image PA is shown in the image diagram 400. The captured image PA includes a vehicle image PV2 and a vehicle image PV3. The vehicle image PV2 is an image of the vehicle V2. The vehicle image PV3 is an image of a vehicle V3. The vehicle V3 is traveling in a lane that is opposite of the lane traveled by the vehicle V1 and the vehicle V2.

The rectangular imaging viewing angle AVA of the solid lines, the rectangular reference viewing angle AVT of the dash-dot lines, the rectangular top viewing angle AVU of the dotted lines, and the rectangular bottom viewing angle AVD of the dotted lines are shown in the image diagram 400.

The top viewing angle AVU is disposed at an upper portion of the imaging viewing angle AVA. The reference viewing angle AVT is disposed in a center portion, in the vertical direction, of the imaging viewing angle AVA. The bottom viewing angle AVD is disposed in a lower portion of the imaging viewing angle AVA. Additionally, the top viewing angle AVU, the reference viewing angle AVT, and the bottom viewing angle AVD are each arranged in a crosswise-direction center portion of the imaging viewing angle AVA.

The captured image PA of the camera 21 is an image within the imaging viewing angle AVA shown in the image diagram 400. In the image diagram 400, the reference viewing angle AVT shows the imaging range of the reference rearward image PT, the top viewing angle AVU shows the imaging range of the top rearward image PU, and the bottom viewing angle AVD shows the imaging range of the bottom rearward image PD.

The first generating portion 112 extracts the reference rearward image PT from the region in the vertical-direction center portion of the captured image PA that corresponds to the reference viewing angle AVT to generate the reference rearward image PT as the first rearward image P1.

The second generating portion 114 extracts the top rearward image PU from a region of the upper portion of the captured image PA that corresponds to the top viewing angle AVU to generate the top rearward image PU as the second rearward image P2. The second generating portion 114 extracts the bottom rearward image PD from a region in the lower portion of the captured image PA that corresponds to the bottom viewing angle AVD, to generate the bottom rearward image PD as the second rearward image P2.

The region in the center portion of the captured image PA that corresponds to the reference viewing angle AVT corresponds to an example of a "region of a portion."

The region of the upper portion of the captured image PA that corresponds to the top viewing angle AVU and the region of the lower portion of the captured image PA that corresponds to the bottom viewing angle AVD each corresponds to examples of a "region of another portion."

The displayed image that is displayed in the display 251 will be explained next in reference to FIG. 3 through FIG. 6. In the present embodiment a case wherein a rear view display that is wider than it is tall will be explained as the display 251.

Figure 3:
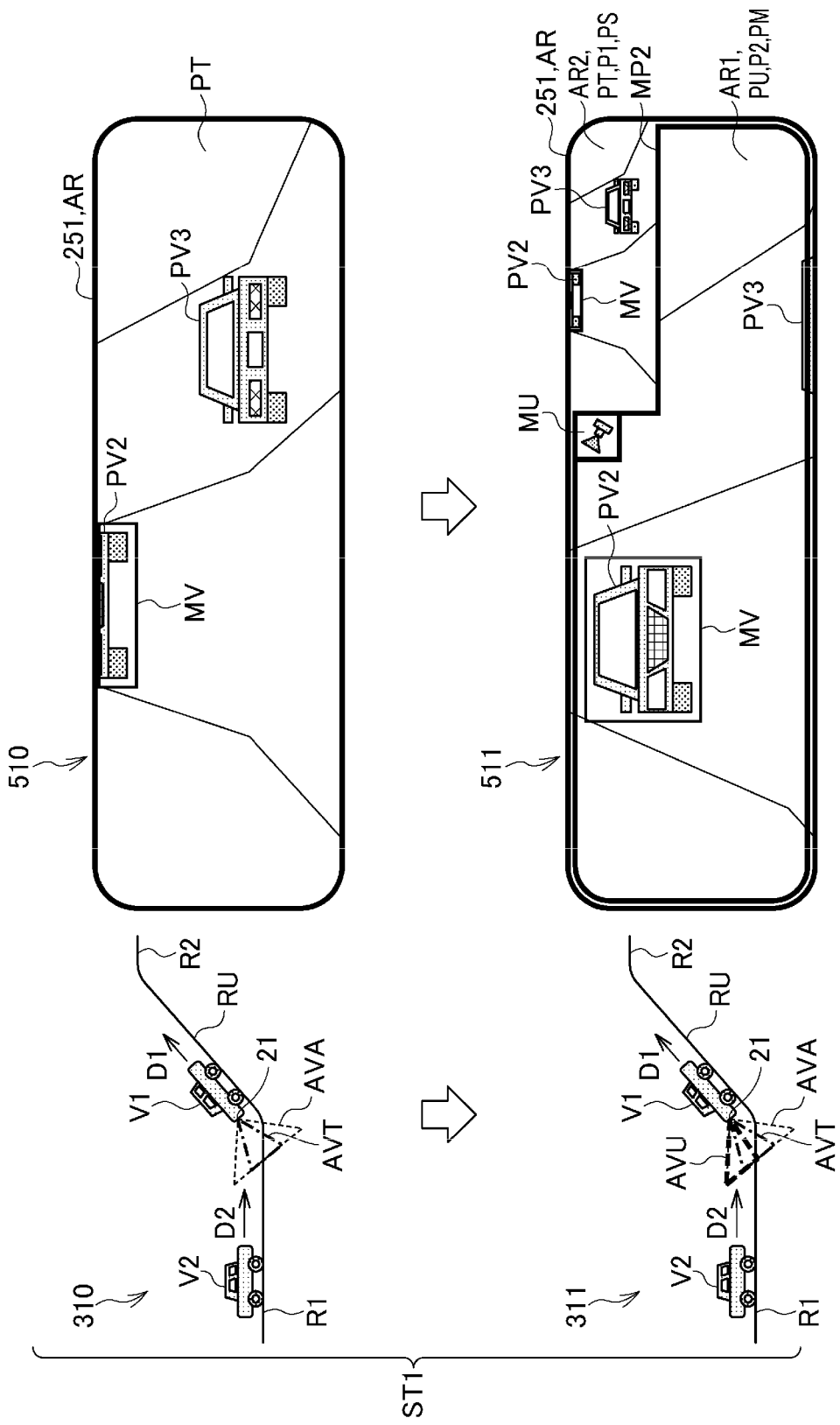
FIG. 3 is a diagram depicting an example of a displayed image in a first state.

FIG. 3 is a diagram depicting an example of a displayed image in the first state ST1. Examples of a conventional side view 310 and an image diagram 510 are shown at the top in FIG. 3.

As shown in the side view 310, the reference rearward image PT is generated by extracting the reference rearward image PT from a region of the center portion that corresponds to the reference viewing angle AVT in the imaging range that corresponds to the captured image PA of the camera 21.

Additionally, as shown in the image diagram 510, the reference rearward image PT is displayed in the entirety of the display region AR of the display 251. The reference rearward image PT includes the vehicle image PV2 and the vehicle image PV3. A mark MV indicates the vehicle image PV2. As depicted in the image diagram 510, a lower portion of the vehicle image PV2 is displayed in the display 251.

Examples of a side view 311 and an image diagram 511 according to the present embodiment are shown at the bottom in FIG. 3.

As shown in the side view 311, the first generating portion 112 generates a reference rearward image PT as the first rearward image P1 by extracting the reference rearward image PT from a region of the center portion that corresponds to the reference viewing angle AVT in the imaging range that corresponds to the captured image PA of the camera 21. The second generating portion 114 generates the top rearward image PU, as the second rearward image P2, by extracting the top rearward image PU from a region of the upper portion that corresponds to the top viewing angle AVU of the imaging range that corresponds to the captured image PA of the camera 21.

Additionally, as shown in the image diagram 511, the display controlling portion 116 sets the first region AR1 and the second region AR2 in the display region AR of the display 251. In the present embodiment, the second region AR2 is disposed at the upper right corner of the display region AR. The first region AR1 is wider than the second region AR2, and is the region that is not the second region AR2 in the display region AR.

The display controlling portion 116 displays the top rearward image PU as the main image PM in the first region AR1 and displays the reference rearward image PT as the sub-image PS in the second region AR2.

If, for example, the top rearward image PU is displayed in the entirety of the display region AR of the display 251 as the main image PM, the second region AR2 may be set to a region, in the top rearward image PU, that does not include an image of a vehicle.

The entirety of the vehicle image PV2 is displayed in the top rearward image PU that is displayed in the first region AR1 of the image diagram 511. Additionally, the top direction imaging mark MU is displayed in the first region AR1 of the image diagram 511. The top direction imaging mark MU indicates that the top rearward image PU is displayed in the first region AR1. A second image display mark MP2 is a heavy line that is positioned around the periphery of the first region AR1. The second image display mark MP2 indicates that the second rearward image P2 is displayed in the first region AR1.

As depicted in the image diagram 511, the entirety of the vehicle image PV2 is displayed in the top rearward image PU that is displayed in the first region AR1, thus enabling easy visual identification, by the user, of the type of vehicle V2 that is traveling to the rear of the vehicle V1.

Figure 4:
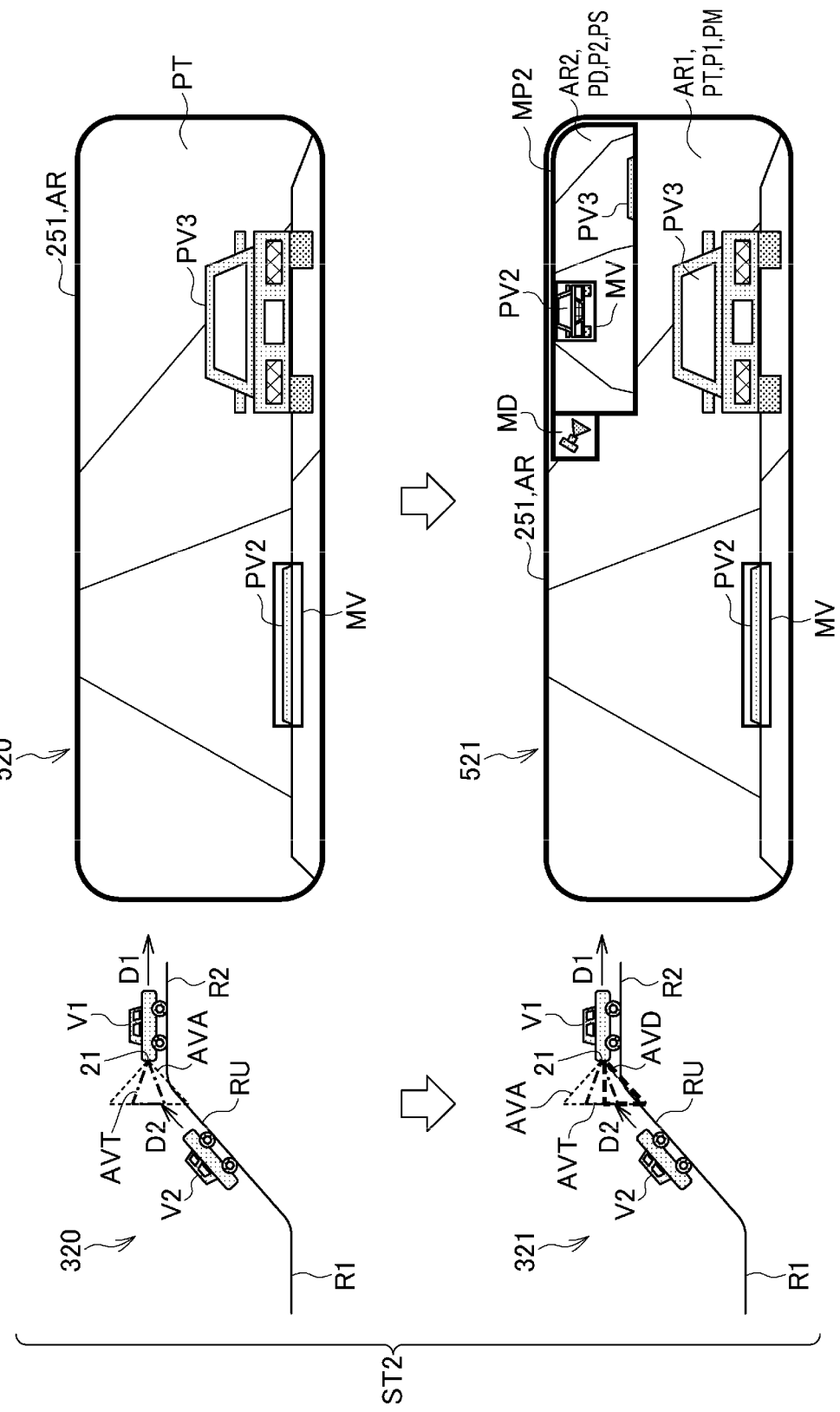
FIG. 4 is a diagram depicting an example of a displayed image in a second state.

FIG. 4 is a diagram depicting an example of a displayed image in the second state ST2. Examples of a conventional side view 320 and an image diagram 520 are shown at the top in FIG. 4.

A vehicle V1 and a vehicle V2 that is traveling in the travel direction D2 to the rear of the vehicle V1 are shown in the side view 320. The vehicle V1 has entered from an upwardly inclined road RU into a second road R2 that is substantially level. That is, the side view 320 shows that the vehicle V1 is in the second state ST2.

As shown in the side view 320, the reference rearward image PT is generated by extracting the reference rearward image PT from a region of the center portion that corresponds to the reference viewing angle AVT in the imaging range that corresponds to the captured image PA of the camera 21.

Additionally, as shown in the image diagram 520, the reference rearward image PT is displayed in the entirety of the display region AR of the display 251. The reference rearward image PT includes the vehicle image PV2 and the vehicle image PV3. A mark MV indicates the vehicle image PV2. As depicted in the image diagram 520, an upper portion of the vehicle image PV2 is displayed in the display 251.

Examples of a side view 321 and an image diagram 521 according to the present embodiment are shown at the bottom in FIG. 4.

As shown in the side view 321, the first generating portion 112 generates a reference rearward image PT as the first rearward image P1 by extracting the reference rearward image PT from a region of the center portion that corresponds to the reference viewing angle AVT in the imaging range that corresponds to the captured image PA of the camera 21. The second generating portion 114 generates the bottom rearward image PD, as the second rearward image P2, by extracting the bottom rearward image PD from a region of the lower portion that corresponds to the bottom viewing angle AVD of the imaging range that corresponds to the captured image PA of the camera 21.

Additionally, as shown in the image diagram 521, the display controlling portion 116 sets the first region AR1 and the second region AR2 in the display region AR of the display 251.

The display controlling portion 116 displays the reference rearward image PT as the main image PM in the first region AR1 and displays the bottom rearward image PD as the sub-image PS in the second region AR2.

If, for example, the reference rearward image PT is displayed in the entirety of the display region AR of the display 251 as the main image PM, the second region AR2 may be set to a region, in the reference rearward image PT, that does not include an image of a vehicle.

The entirety of the vehicle image PV2 is displayed in the bottom rearward image PD that is displayed in second region AR2 of the image diagram 521. Additionally, the bottom direction imaging mark MD is displayed in the second region AR2 of the image diagram 521. The bottom direction imaging mark MD indicates that the bottom rearward image PD is displayed in the second region AR2. A second image display mark MP2 is a heavy line that is positioned around the periphery of the second region AR2. The second image display mark MP2 indicates that the second rearward image P2 is displayed in the second region AR2.

As depicted in the image diagram 521, the entirety of the vehicle image PV2 is displayed in the bottom rearward image PD that is displayed in the second region AR2, thus enabling easy visual identification, by the user, of the type of vehicle V2 that is traveling to the rear of the vehicle V1.

Figure 5:
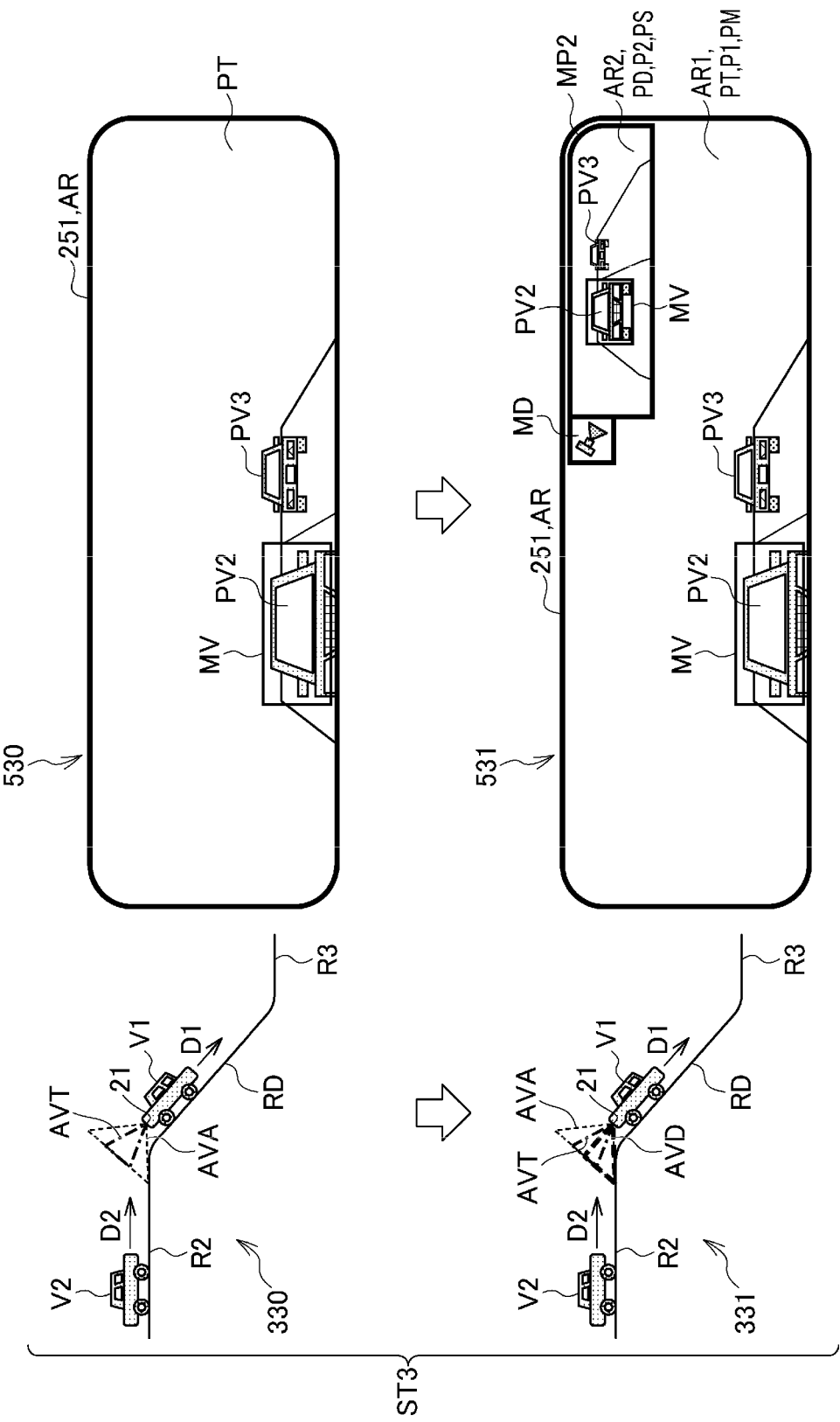
FIG. 5 is a diagram depicting an example of a displayed image in a third state.

FIG. 5 is a diagram depicting an example of a displayed image in the third state ST3. Examples of a conventional side view 330 and an image diagram 530 are shown at the top in FIG. 5.

A vehicle V1 and a vehicle V2 that is traveling in the travel direction D2 to the rear of the vehicle V1 are shown in the side view 330. The vehicle V1 has entered into a downwardly inclined road RD from a second road R2 that is substantially level. That is, the side view 330 shows that the vehicle V1 is in the third state ST3.

As shown in the side view 330, the reference rearward image PT is generated by extracting the reference rearward image PT from a region of the center portion that corresponds to the reference viewing angle AVT in the imaging range that corresponds to the captured image PA of the camera 21.

Additionally, as shown in the image diagram 530, the reference rearward image PT is displayed on the display 251. The reference rearward image PT includes the vehicle image PV2 and the vehicle image PV3. A mark MV indicates the vehicle image PV2. As depicted in the image diagram 530, an upper portion of the vehicle image PV2 is displayed in the display 251.

Examples of a side view 331 and an image diagram 531 according to the present embodiment are shown at the bottom in FIG. 5.

As shown in the side view 331, the first generating portion 112 generates a reference rearward image PT as the first rearward image P1 by extracting the reference rearward image PT from a region of the center portion that corresponds to the reference viewing angle AVT in the imaging range that corresponds to the captured image PA of the camera 21. The second generating portion 114 generates the bottom rearward image PD, as the second rearward image P2, by extracting the bottom rearward image PD from a region of the lower portion that corresponds to the bottom viewing angle AVD of the imaging range that corresponds to the captured image PA of the camera 21.

Additionally, as shown in the image diagram 531, the display controlling portion 116 sets the first region AR1 and the second region AR2 in the display region AR of the display 251.

The display controlling portion 116 displays the reference rearward image PT as the main image PM in the first region AR1 and displays the bottom rearward image PD as the sub-image PS in the second region AR2.

If, for example, the reference rearward image PT is displayed in the entirety of the display region AR of the display 251 as the main image PM, the second region AR2 may be set to a region, in the reference rearward image PT, that does not include an image of a vehicle.

The entirety of the vehicle image PV2 is displayed in the bottom rearward image PD that is displayed in second region AR2 of the image diagram 531. Additionally, the bottom direction imaging mark MD is displayed in the second region AR2 of the image diagram 531. The bottom direction imaging mark MD indicates that the bottom rearward image PD is displayed in the second region AR2. A second image display mark MP2 is a heavy line that is positioned around the periphery of the second region AR2. The second image display mark MP2 indicates that the second rearward image P2 is displayed in the second region AR2.

As depicted in the image diagram 531, the entirety of the vehicle image PV2 is displayed in the bottom rearward image PD that is displayed in the second region AR2, thus enabling easy visual identification, by the user, of the type of vehicle V2 that is traveling to the rear of the vehicle V1.

Figure 6:
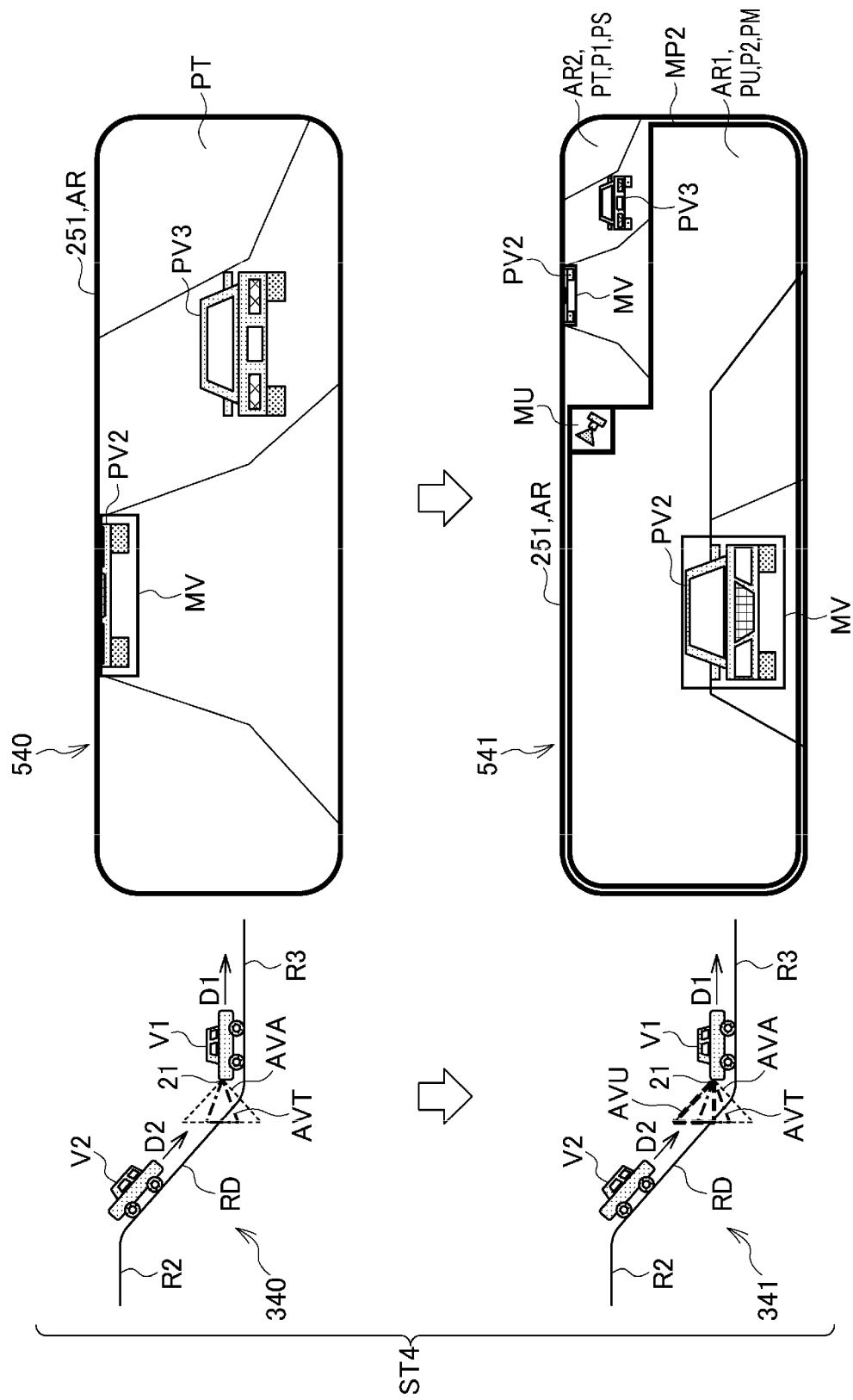
FIG. 6 is a diagram depicting an example of a displayed image in a fourth state.

FIG. 6 is a diagram depicting an example of a displayed image in the fourth state ST4. Examples of a conventional side view 340 and an image diagram 540 are shown at the top in FIG. 6.

A vehicle V1 and a vehicle V2 that is traveling in the travel direction D2 to the rear of the vehicle V1 are shown in the side view 340. The vehicle V1 has entered from a downwardly inclined road RD into a third road R3 that is substantially level. That is, the side view 340 shows that the vehicle V1 is in the fourth state ST4.

As shown in the side view 340, the reference rearward image PT is generated by extracting the reference rearward image PT from a region of the center portion that corresponds to the reference viewing angle AVT in the imaging range that corresponds to the captured image PA of the camera 21.

Additionally, as shown in the image diagram 540, the reference rearward image PT is displayed on the display 251 as the first rearward image P1. The reference rearward image PT includes the vehicle image PV2 and the vehicle image PV3. A mark MV indicates the vehicle image PV2. As depicted in the image diagram 540, a lower portion of the vehicle image PV2 is displayed in the display 251.

Examples of a side view 341 and an image diagram 541 according to the present embodiment are shown at the bottom in FIG. 6.

As shown in the side view 341, the first generating portion 112 generates a reference rearward image PT as the first rearward image P1 by extracting the reference rearward image PT from a region of the center portion that corresponds to the reference viewing angle AVT in the imaging range that corresponds to the captured image PA of the camera 21. The second generating portion 114 generates the top rearward image PU, as the second rearward image P2, by extracting the top rearward image PU from a region of the upper portion that corresponds to the top viewing angle AVU of the imaging range that corresponds to the captured image PA of the camera 21.

Additionally, as shown in the image diagram 541, the display controlling portion 116 sets the first region AR1 and the second region AR2 in the display region AR of the display 251.

The display controlling portion 116 displays the top rearward image PU as the main image PM in the first region AR1 and displays the reference rearward image PT as the sub-image PS in the second region AR2.

If, for example, the top rearward image PU is displayed in the entirety of the display region AR of the display 251 as the main image PM, the second region AR2 may be set to a region, in the top rearward image PU, that does not include an image of a vehicle.

The entirety of the vehicle image PV2 is displayed in the top rearward image PU that is displayed in the first region AR1 of the image diagram 541. Additionally, the top direction imaging mark MU is displayed in the first region AR1 of the image diagram 541. The top direction imaging mark MU indicates that the top rearward image PU is displayed in the first region AR1. A second image display mark MP2 is a heavy line that is positioned around the periphery of the first region AR1. The second image display mark MP2 indicates that the second rearward image P2 is displayed in the first region AR1.

As depicted in the image diagram 541, the entirety of the vehicle image PV2 is displayed in the top rearward image PU that is displayed in the first region AR1, thus enabling easy visual identification, by the user, of the type of vehicle V2 that is traveling to the rear of the vehicle V1.

As explained in reference to FIG. 3 through FIG. 6, a first rearward image P1 and a second rearward image P2 that is different from the first rearward image P1 are displayed on the display 251, enabling easy visual identification by the user of the type of vehicle V2 that is traveling to the rear of the vehicle V1.

While in FIG. 3 through FIG. 6 the explanation was for a case wherein the second region AR2 was disposed at the upper right corner of the display region AR of the display 251, there is no limitation thereto. When the main image PM is displayed in the entirety of the display region AR of the display 251, preferably the second region AR2 is a region in the main image PM that does not include an image of a vehicle. This is so that the image of the vehicle in the main image PM will not be hidden by the sub-image PS through displaying the sub-image PS in the second region AR2. This enables an improvement in the visibility of the main image PM.

Figure 7:
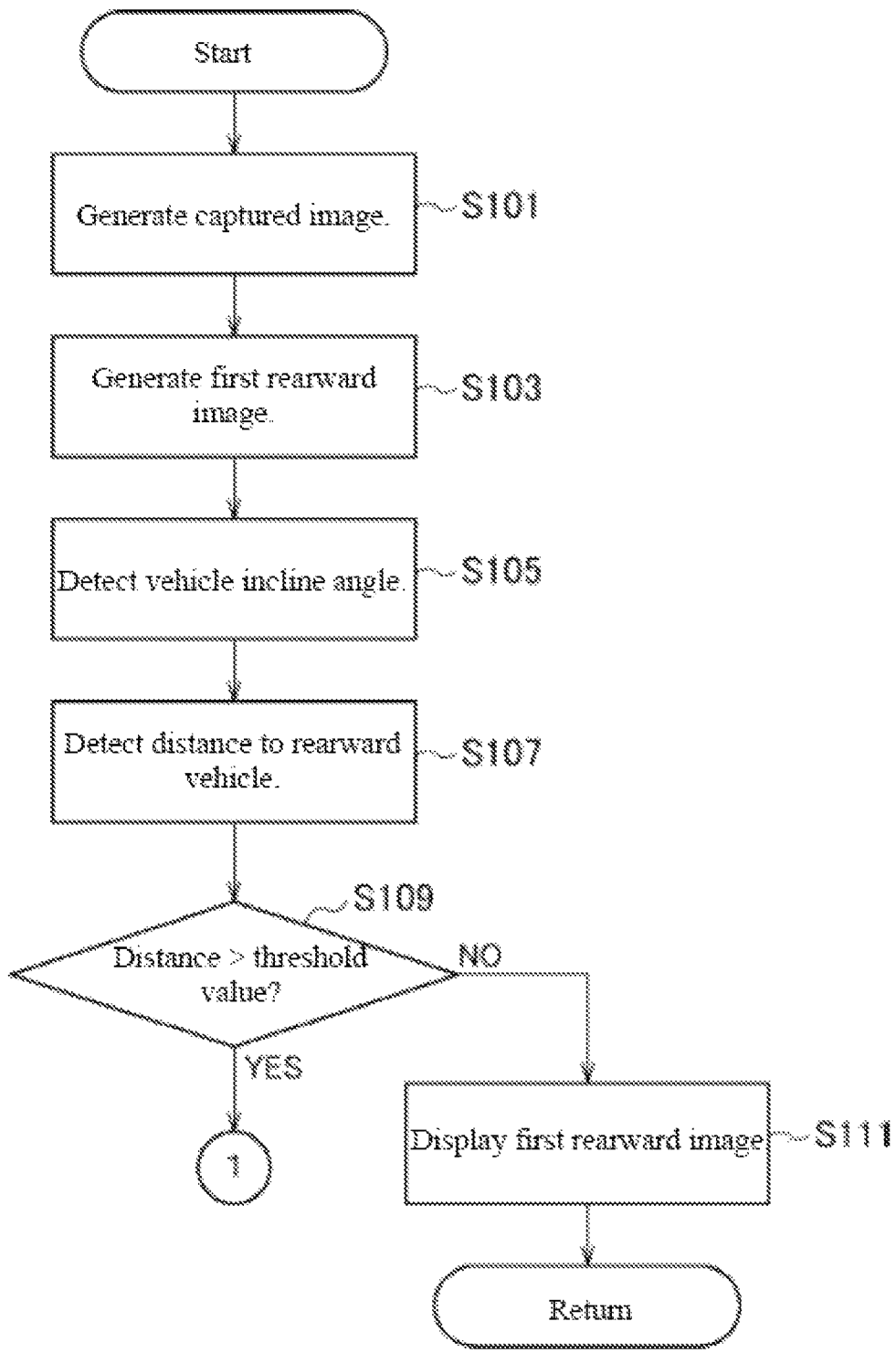
FIG. 7 is a flowchart showing an example of processing in a rearward image displaying device.
Figure 8:
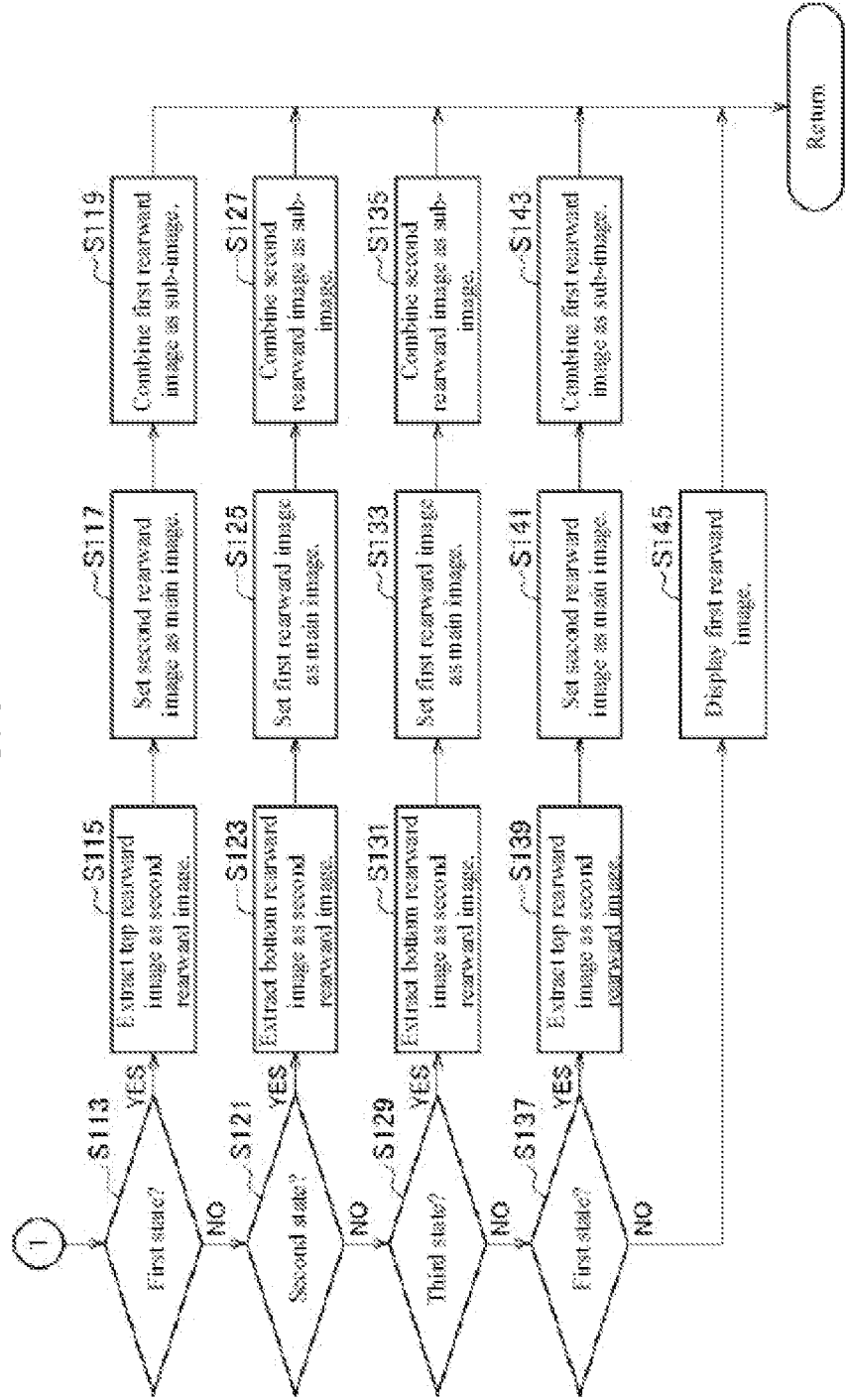
FIG. 8 is a flowchart showing an example of processing in a rearward image displaying device.

FIG. 7 and FIG. 8 will be referenced next to explain the processing in the rearward image displaying device 1. FIG. 7 and FIG. 8 are flowcharts showing an example of the processing in the rearward image displaying device 1.

First, as illustrated in FIG. 7, in Step S101 the imaging portion 111 generates the captured image PA by capturing an image, through the camera 21, to the rear of the vehicle V1.

Next, in Step S103, the first generating portion 112 generates a first rearward image P1 by extracting an image from a region of a portion of the captured image PA. The first rearward image P1 may be, for example, the reference rearward image PT.

Next, in Step S105, the incline detecting portion 113 detects the incline angle AN of the vehicle V1.

Following this, in Step S107, the distance detecting portion 115 detects the distance LD between the vehicle V1 and another vehicle V2 that is traveling to the rear of the vehicle V1.

Next, in Step S109, the display controlling portion 116 evaluates whether or not the distance LD is greater than a threshold value LS.

If the display controlling portion 116 evaluates that the distance LD is not greater than the threshold value LS (Step S109: NO), processing advances to Step S111.

In Step S111, the display controlling portion 116 displays the first rearward image P1, that is, the reference rearward image PT, in the entirety of the display region AR of the display 251. Processing then returns to Step S101.

If the display controlling portion 116 evaluates that the distance LD is greater than the threshold value LS (Step S109: YES), processing advances to Step S113 of FIG. 8.

Given this, in Step S113 of FIG. 8 the display controlling portion 116 evaluates whether or not the vehicle V1 is in the first state ST1, depending on the change in the incline angle AN over time. The first state ST1 is a state wherein the vehicle V1 has entered onto an upwardly inclined road RU from a first road R1 that is substantially level.

If the display controlling portion 116 evaluates that the vehicle V1 is not in the first state ST1 (Step S113: NO), processing advances to Step S121. If the display controlling portion 116 evaluates that the vehicle V1 is in the first state ST1 (Step S113: YES), processing advances to Step S115.

Given this, in Step S115, the second generating portion 114 generates the top rearward image PU by extracting the top rearward image PU from the captured image PA as the second rearward image P2.

Next, in Step S117, the display controlling portion 116 sets the second rearward image P2 as the main image PM.

Following this, in Step S119, the display controlling portion 116 combines the first rearward image P1, as the sub-image PS, with the main image PM. That is, the display controlling portion 116 generates a displayed image by combining the main image PM and the sub-image PS, with the top rearward image PU, which is the second rearward image P2, as the main image PM, and the first rearward image P1 as the sub-image PS. Following this, the display controlling portion 116 displays the generated displayed image on the display 251. Processing then returns to Step S101 of FIG. 7.

If NO in Step S113, that is, if the display controlling portion 116 has evaluated that the vehicle V1 is not in the first state ST1, then, in Step S121, the display controlling portion 116 evaluates whether or not the vehicle V1 is in the second state ST2, depending on the change in the incline angle AN over time. The second state ST2 is a state wherein a second road R2 that is substantially level has been entered from an upwardly inclined road RU.

If the display controlling portion 116 evaluates that the vehicle V1 is not in the second state ST2 (Step S121: NO), processing advances to Step S129. If the display controlling portion 116 evaluates that the vehicle V1 is in the second state ST2 (Step S121: YES), processing advances to Step S123.

Given this, in Step S123, the second generating portion 114 generates the bottom rearward image PD by extracting the bottom rearward image PD from the captured image PA as the second rearward image P2.

Next, in Step S125, the display controlling portion 116 sets the first rearward image P1 as the main image PM.

Following this, in Step S127, the display controlling portion 116 combines the second rearward image P2, as the sub-image PS, with the main image PM. That is, the display controlling portion 116 generates a displayed image by combining the main image PM and the sub-image PS, with the first rearward image P1 as the main image PM, and the bottom rearward image PD, which is the second rearward image P2, as the sub-image PS. Following this, the display controlling portion 116 displays the generated displayed image on the display 251. Processing then returns to Step S101 of FIG. 7.

If NO in Step S121, that is, if the display controlling portion 116 has evaluated that the vehicle V1 is not in the second state ST2, then, in Step S129, the display controlling portion 116 evaluates whether or not the vehicle V1 is in the third state ST3, depending on the change in the incline angle AN over time. The third state ST3 is a state wherein a downwardly inclined road RD has been entered from a second road R2 that is substantially level.

If the display controlling portion 116 evaluates that the vehicle V1 is not in the third state ST3 (Step S129: NO), processing advances to Step S137. If the display controlling portion 116 evaluates that the vehicle V1 is in the third state ST3 (Step S129: YES), processing advances to Step S131.

Given this, in Step S131, the second generating portion 114 generates the bottom rearward image PD by extracting the bottom rearward image PD from the captured image PA as the second rearward image P2.

Next, in Step S133, the display controlling portion 116 sets the first rearward image P1 as the main image PM.

Following this, in Step S135, the display controlling portion 116 combines the second rearward image P2, as the sub-image PS, with the main image PM. That is, the display controlling portion 116 generates a displayed image by combining the main image PM and the sub-image PS, with the first rearward image P1 as the main image PM, and the bottom rearward image PD, which is the second rearward image P2, as the sub-image PS. Following this, the display controlling portion 116 displays the generated displayed image on the display 251. Processing then returns to Step S101 of FIG. 7.

If NO in Step S129, that is, if the display controlling portion 116 has evaluated that the vehicle V1 is not in the third state ST3, then, in Step S137, the display controlling portion 116 evaluates whether or not the vehicle V1 is in the fourth state ST4, depending on the change in the incline angle AN over time. The fourth state ST4 is a state wherein a third road R3 that is substantially level is entered from the downwardly inclined road RD.

If the display controlling portion 116 evaluates that the vehicle V1 is not in the fourth state ST4 (Step S137: NO), processing advances to Step S145.

In Step S145, the display controlling portion 116 displays the first rearward image P1 in the entirety of the display region AR of the display 251. Processing then returns to Step S101.

If the display controlling portion 116 evaluates that the vehicle V1 is in the fourth state ST4 (Step S137: YES), processing advances to Step S139.

Given this, in Step S139, the second generating portion 114 generates the top rearward image PU by extracting the top rearward image PU from the captured image PA as the second rearward image P2.

Next, in Step S141, the display controlling portion 116 sets the second rearward image P2 as the main image PM.

Following this, in Step S143, the display controlling portion 116 combines the first rearward image P1, as the sub-image PS, with the main image PM. That is, the display controlling portion 116 generates a displayed image by combining the main image PM and the sub-image PS, with the top rearward image PU, which is the second rearward image P2, as the main image PM, and the first rearward image P1 as the sub-image PS. Following this, the display controlling portion 116 displays the generated displayed image on the display 251. Processing then returns to Step S101 of FIG. 7.

Step S101 corresponds to an example of an "imaging step." Step S103 corresponds to an example of a "first generating step." Step S105 corresponds to an example of an "incline detecting step."

Step S115, Step S123, Step S131, and Step S139 correspond to examples of a "second generating step."

Moreover, Step S119, Step S127, Step S135, and Step S143 correspond to examples of a "display controlling step."

As explained in reference to FIG. 7 and FIG. 8, the display controlling portion 116 evaluates whether or not the vehicle V1 is in a first state ST1, a second state ST2, a third state ST3, or a fourth state ST4, depending on the change over time in the incline angle AN. Given this, the second generating portion 114 generates a top rearward image PU or a bottom rearward image PD as the second rearward image P2, depending on the state evaluated by the display controlling portion 116. The display controlling portion 116 displays the first rearward image P1 and the second rearward image P2 on the display 251.

Through this, the top rearward image PU or the bottom rearward image PD is generated as the second rearward image P2, depending on the state evaluated by the display controlling portion 116, enabling the top rearward image PU or the bottom rearward image PD to be generated and displayed appropriately as the second rearward image P2. This enables easy visual identification of what type of vehicle V2 is traveling to the rear of the vehicle V1.

As explained above in reference to FIG. 1 through FIG. 8, the rearward image displaying device 1 according to the present embodiment comprises: an imaging portion 111 for generating a captured image PA by imaging, through a camera 21, to the rear of the vehicle V1; a first generating portion 112 for generating a first rearward image P1 by extracting an image from a region of a portion of the captured image PA; an incline detecting portion 113 for detecting an incline angle AN of the vehicle V1; a second generating portion for generating a second rearward image P2, which is different from the first rearward image P1, by extracting an image of a region of another portion of the captured image PA depending on the incline angle AN; and a display controlling portion 116 for displaying the first rearward image P1 and the second rearward image P2 on the display 251.

That is, a first rearward image P1 is generated by extracting an image from a region of a portion of the captured image PA, and a second rearward image P2 that is different from the first rearward image P1 is generated through extracting an image from another portion of the captured image PA, depending on the incline angle AN. Given this, the first rearward image P1 and the second rearward image P2 are displayed on the display 251.

As a result, the second rearward image P2 is generated by extracting an image from a region of another portion of the captured image PA depending on the incline angle AN, enabling the second rearward image P2 to be generated through extraction from a suitable region of the captured image PA. Additionally, because the first rearward image P1 and the second rearward image P2 are displayed on the display 251, this enables easy visual identification of what type of vehicle V2 is traveling to the rear of the vehicle V1.

Additionally, a distance detecting portion 115 is provided for detecting a distance LD between the vehicle V1 and another vehicle V2 that is traveling to the rear of the vehicle V1, and the display controlling portion 116 does not display the second rearward image P2 on the display 251 if the distance LD is equal to or less than a threshold value LS.

In other words, if the distance LD is equal to or less than the threshold value LS, the first rearward image P1 will be displayed alone in the entirety of the display region AR of the display 251. The threshold value LS may be set, for example, so that the vehicle image PV2 will be included in the first rearward image P1 if the distance LD is equal to or less than the threshold value LS. Consequently, because the vehicle image PV2 is included in the first rearward image P1 and the first rearward image P1 alone is displayed in the entirety of the display region AR of the display 251, this enables easy visual identification of what type of vehicle V2 is traveling to the rear of the vehicle V1.

Additionally, the display controlling portion 116 displays a main image PM that is displayed in a first region AR1 within the display region AR of the display 251, and a sub-image PS that is displayed in a second region AR2, which is narrower than the first region AR1, in the display region AR, displaying one of the images, the first rearward image P1 or the second rearward image P2, as the main image PM and the other of the images, the first rearward image P1 or the second rearward image P2, as the sub-image PS.

That is, one of the images, the first rearward image P1 or the second rearward image P2, is displayed as the main image PM, and the other of the images, the first rearward image P1 or the second rearward image P2, is displayed as the sub-image PS. Determining the main image PM and the sub-image PS appropriately enables easy visual identification what type of vehicle V2 is traveling to the rear of the vehicle V1.

Moreover, the display controlling portion 116 displays the main image PM in the entirety of the display region AR of the display 251 and sets, as the second region AR2, a region wherein no image of a vehicle is included in the main image PM, and displays the sub-image PS in the second region.

Thus a region wherein no image of a vehicle is included in the main image PM is set as the second region AR2, enabling the second region AR2 to be set appropriately.

Additionally, the rearward image displaying method according to the present embodiment includes: an imaging step for generating a captured image PA by imaging, through a camera 21, to the rear of the vehicle V1; a first generating step for generating a first rearward image P1 by extracting an image from a region of a portion of the captured image PA; an incline detecting step for detecting an incline angle AN of the vehicle V1; a second generating step for generating a second rearward image P2, which is different from the first rearward image P1, by extracting an image from a region of another portion of the captured image PA, depending on the incline angle AN; and a display controlling step for displaying the first rearward image P1 and the second rearward image P2 on a display 251.

Thus the method according to the present embodiment has the same effects in operation as the rearward image displaying device 1 according to the present embodiment.

The embodiment set forth above is no more than an illustration of one form of the present invention, and the present invention may be modified and applied appropriately in a range that does not deviate from the spirit and intent thereof.

For example, for ease in understanding the present invention, FIG. 1 is a diagram wherein the structural elements are shown partitioned into the main processing details, and the structural elements may be partitioned into more structural elements depending on the processing details. Moreover, the partitioning may be such that more processes are carried out by a single structural element.

Moreover, the processes in any of the structural elements may be executed in a single hardware or executed by a plurality of hardware. Moreover, the processes of each structural elements may be achieved by a single program, or by a plurality of programs.

Additionally, in FIG. 1 the rearward image displaying device 1 may be provided integrated with the incline sensor 22, the operating portion 24, and/or the displaying portion 50.

In addition, while in the present embodiment the display controlling portion 116 evaluated whether or not the vehicle V1 was in any of the first state ST1 through the fourth state ST4 depending on a change in the incline angle AN over time, there is no limitation thereto. Instead the second generating portion 114 may generate the top rearward image PU or the bottom rearward image PD as the second rearward image P2 depending on the incline angle AN.

Moreover, when the obstacle displaying method according to the present invention is achieved using a computer, the structure may be in the form of a recording medium whereon a control program 121 to be executed by a computer is recorded, or a transmitting medium for transmitting the control program 121.

The recording medium may use a magnetic or optical recording medium, or a semiconductor memory device. Specifically, it may be a fixed recording medium or a portable recording medium such as a flexible disk, an HDD, a CD-ROM (Compact Disk Read-Only Memory), a DVD, a Blu-ray® disc, a magnetooptical disc, a flash memory, a card-type recording medium, or the like. Moreover, the recording medium may be a RAM, a ROM, or a non-volatile storage device, such as an HDD, provided by the rearward image displaying device 1.

Additionally, the rearward image displaying device 1 may download the control program 121 from a server device that is connected communicatively through a network to the rearward image displaying device 1.

Moreover, the processing unit in the flowcharts shown in FIG. 7 and FIG. 8 are partitioned depending on the main processing details thereof to facilitate easy understanding of the processes of the rearward image displaying device 1, for example, but the present invention is not limited by the names and ways in which the processing units are divided. The processes of the rearward image displaying device 1 may be divided into more processing units depending on the process details. Moreover, the processes of the rearward image displaying device 1 may instead be divided so as to include more processes in a single processing unit.

EXPLANATIONS OF REFERENCE SYMBOLS

100: Rearward Image Displaying System
1: Rearward Image Displaying Device
11: Processor
111: Imaging Portion
112: First Generating Portion
113: Incline Detecting Portion
114: Second Generating Portion
115: Distance Detecting Portion
116: Display Controlling Portion
12: Memory
121: Control Program
122: Image Storing Portion
123: Incline Storing Portion
21: Camera
22: Incline Sensor
23: Distance Measuring Sensor
24: Operating Portion
25: Displaying Portion
251: Display
AN: Incline Angle
AR1: First Region
AR2: Second Region
AVA Imaging Viewing Angle
MD: Bottom Direction Imaging Mark
MU: Top Direction Imaging Mark
P1: First Rearward Image
P2: Second Rearward Image
PA: Captured Image
PM: Main Image
PS: Sub-Image
V1, V2, V3: Vehicles

What is claimed is:

1. A rearward image displaying device, comprising:
a processor,
wherein the processor includes:
an imaging portion for generating a captured image by imaging, through a camera, to the rear of a vehicle;
a first generating portion configured to generate a first rearward image by extracting an image from a region of a portion of the captured image;
an incline detecting portion configured to detect an incline angle of the vehicle;
a second generating portion configured to generate a second rearward image, which is different from the first rearward image, by extracting an image from a region of another portion of the captured image depending on the incline angle;
a display controlling portion configured to display the first rearward image and the second rearward image on a display; and
a distance detecting portion configured to detect a distance between the vehicle and another vehicle that is traveling to a rear of the vehicle,
wherein when the distance between the vehicle and another vehicle that is traveling to the rear of the vehicle is equal to or less than a threshold value, the display controlling portion does not display the second rearward image on the display.

2. The rearward image displaying according to claim 1, when the distance between the vehicle and another vehicle that is traveling to the rear of the vehicle is greater than a threshold value, the display controlling portion displays the first rearward image and the second rearward image on the display.

3. The rearward image displaying device set forth in according to claim 1, wherein
the display controlling portion displays a main image that is displayed in a first region of the display region of the display and a sub-image that is displayed in a second region, which is narrower than the first region, of the display region;
displays, as the main image, either the first rearward image or the second rearward image; and
displays, as the sub-image, the other of the first rearward image or the second rearward image.

4. The rearward image displaying device according to claim 3, wherein
the display controlling portion displays the main image in the entirety of the display region of the display,
sets, as the second region, a region wherein no image of a vehicle is included in the main region; and
displays the sub-image in the second region.

5. A method of displaying a rearward image by a rearward image displaying device including a processor, the method comprising the steps of:

generating a captured image by imaging, through a camera, to the rear of a vehicle;

generating a first rearward image by extracting an image from a region of a portion of the captured image;

detecting an incline angle of the vehicle;

generating a second rearward image, which is different from the first rearward image, by extracting an image from a region of another portion of the captured image depending on the incline angle;

displaying the first rearward image and the second rearward image on a display; and detecting a distance between the vehicle and another vehicle that is traveling to a rear of the vehicle, wherein when the distance between the vehicle and another vehicle that is traveling to the rear of the vehicle is equal to or less than a threshold value, the second rearward image is not displayed on the display.

6. The rearward image displaying device according to claim 1, wherein when the distance is equal to or less than the threshold value, the threshold value is set to include a vehicle image of another vehicle in the first rearward image.

7. The method of displaying according to claim 5, wherein when the distance between the vehicle and another vehicle that is traveling to the rear of the vehicle is greater than a threshold value, the first rearward image and the second rearward image are displayed on the display.

8. The method of displaying according to claim 5, wherein the step of displaying includes the steps of displaying a main image that is displayed in a first region of the display region of the display and a sub-image that is displayed in a second region, which is narrower than the first region, of the display region;

displaying, as the main image, either the first rearward image or the second rearward image; and displaying, as the sub-image, the other of the first rearward image or the second rearward image.

9. The method of displaying according to claim 8, wherein the step of displaying includes the steps of displaying the main image in the entirety of the display region of the display, setting, as the second region, a region wherein no image of a vehicle is included in the main region; and displaying the sub-image in the second region.

10. The method of displaying according to claim 5, wherein when the distance is equal to or less than the threshold value, the threshold value is set to include a vehicle image of another vehicle in the first rearward image.

* * * * *